(12) United States Patent
Yaguchi

(10) Patent No.: US 8,567,282 B2
(45) Date of Patent: Oct. 29, 2013

(54) THROTTLE GRIP APPARATUS

(75) Inventor: Tomohiro Yaguchi, Hamamatsu (JP)

(73) Assignee: Asahi Denso Co., Ltd., Shizuoka (JP)

( * ) Notice: Subject to any disclaimer, the term of this patent is extended or adjusted under 35 U.S.C. 154(b) by 592 days.

(21) Appl. No.: 12/788,719

(22) Filed: May 27, 2010

(65) Prior Publication Data

US 2010/0307282 A1    Dec. 9, 2010

(30) Foreign Application Priority Data

Jun. 5, 2009  (JP) ................................ 2009-135613

(51) Int. Cl.
    *G05G 1/08*    (2006.01)
    *G05G 5/06*    (2006.01)

(52) U.S. Cl.
    USPC ............................................. 74/504; 74/531

(58) Field of Classification Search
    USPC .......... 74/473.12, 484 R, 485, 486, 488, 504, 74/531, 551.9
    See application file for complete search history.

(56) References Cited

U.S. PATENT DOCUMENTS

| | | | |
|---|---|---|---|
| 5,134,897 A * | 8/1992 | Romano | 74/489 |
| 6,832,511 B2 * | 12/2004 | Samoto et al. | 73/114.36 |
| 6,978,694 B2 * | 12/2005 | Peppard | 74/489 |
| 8,272,294 B2 * | 9/2012 | Ashman | 74/531 |
| 2003/0159529 A1 | 8/2003 | Samoto et al. | |
| 2003/0169002 A1 | 9/2003 | Hughes | |
| 2004/0107789 A1 | 6/2004 | Peppard | |
| 2005/0251301 A1 | 11/2005 | Suzuki | |
| 2010/0018338 A1 * | 1/2010 | Mauch | 74/488 |
| 2010/0162848 A1 * | 7/2010 | Suzuki | 74/504 |

FOREIGN PATENT DOCUMENTS

| | | |
|---|---|---|
| EP | 1452434 A2 | 9/2004 |
| EP | 1553277 A1 | 7/2005 |
| JP | 4-254278 A | 9/1992 |

OTHER PUBLICATIONS

Extended European search report dated Jul. 29, 2010, issued by the European Patent Office in counterpart European Application No. 10163349.3-2425.

* cited by examiner

*Primary Examiner* — Thomas R Hannon
*Assistant Examiner* — Adam D Rogers
(74) *Attorney, Agent, or Firm* — Sughrue Mion, PLLC

(57) ABSTRACT

A throttle grip apparatus is provided with a throttle grip (1) rotatably mounted on a leading end of a handlebar (H) of a vehicle, a magnet (6) which is integrally rotatable with the throttle grip (1), a detector (13) for detecting variations of a magnetic field of the magnet (6) in a non-contact manner so as to detect a rotation angle of the throttle grip (1), and a frictional device (9, 10) for generating a resistance force during a rotation of the throttle grip (1). The resistance force is variable.

4 Claims, 4 Drawing Sheets

THROTTLE GRIP APPARATUS

BACKGROUND OF THE INVENTION

1. Field of the Invention

The present invention relates to a throttle grip apparatus which is used to control an engine of a vehicle based on a rotation angle of a throttle grip.

2. Background Art

Recently, there has been popularized a two-wheeled vehicle in which a rotation angle of a throttle grip is detected by a throttle opening angle sensor such as a potentiometer and the detected value is transmitted as an electric signal to an electronic control unit or the like mounted on the two-wheeled vehicle. The electronic control unit executes a given operation according to the electric signal expressing the detected value and, according to an operation result, an ignition time of an engine or an opening/closing of an exhaust valve is controlled.

For example, in JP-A-04-254278, there is disclosed a throttle grip apparatus which has the above-mentioned structure. That is, the throttle grip apparatus mainly includes a drive pulley portion rotatable in linking with a throttle grip, a detecting gear meshingly engageable with a gear formed in a portion of the drive pulley portion, a potentiometer for detecting the rotation angle of the detecting gear, and a case for storing the above composing elements therein. In the throttle grip apparatus, when a driver turns the throttle grip, the potentiometer is rotated through the drive pulley portion, whereby the throttle opening angle of the throttle grip can be detected.

In the above throttle grip apparatus, since the rotation angle of the throttle grip can be detected using the throttle opening angle sensor, there is eliminated a need of an operation cable which has been used in a general-purpose manner in order to transmit the rotation operation of the throttle grip to the engine side. However, in this case, there is removed the sliding resistance that is produced due to the sliding movement of an inner tube with respect to an outer tube constituting the operation cable when the conventional throttle grip is rotated. Thus, a force to be transmitted to the driver in the rotation of the throttle grip provides only the return force of a return spring for returning the throttle grip to its initial position, which gives the driver a strange feeling.

In order to solve such problem, as disclosed, for example, in US2003/0159529, there is proposed an apparatus in which a fixed side friction plate and a rotation side friction plate respectively for applying a friction force in the opposite direction to the rotation direction of the throttle grip when it is rotated are disposed within a case fixed at a position adjacent to the throttle grip, whereby the rotation load of the throttle grip is obtained due to the frictional force of the rotation side friction plate with respect to the fixed side friction plate. According to such conventional throttle grip apparatus, a throttle wire can be omitted and the throttle grip can be operated without applying a strange feeling to the rider.

However, in the above-mentioned throttle grip apparatus, since the resistance force to be produced by the friction plates is constant regardless of the rotation angle of the throttle grip, it is difficult to meet the following requirements of a user: that is, when the rotation angle of the throttle grip is large and it is desired to produce a larger rotation load, or, reversely, when the rotation angle of the throttle grip is small and it is desired to produce a larger rotation load, such larger rotation loads cannot be obtained.

SUMMARY OF THE INVENTION

One or more embodiments of the present invention provide a throttle grip apparatus which can variously change a rotation load in a rotation operation of a throttle grip based on a demand of a user.

In accordance with one or more embodiments of the invention, a throttle grip apparatus is provided with: a throttle grip 1 rotatably mounted on a leading end of a handlebar H of a vehicle; a magnet 6 which is integrally rotatable with the throttle grip 1; a detector 13 that detects variations of a magnetic field of the magnet 6 in a non-contact manner and also detects a rotation angle of the throttle grip 1 according to a value of the detected variation of the magnetic field, wherein an engine of the vehicle is controlled based on the detected value; and a frictional device 9, 10 configured to generate a resistance force during a rotation of the throttle grip 1 and generate a rotation load of the throttle grip 1. The frictional device 9, 10 is configured to vary the resistance force based on the rotation angle of the throttle grip 1.

According to this structure, since the frictional device 9, 10 is configured such that its resistance force can be varied based on the rotation angle of the throttle grip 1, the rotation load of the throttle grip 1 during a rotation operation of the throttle grip 1 can be variously varied based on a demand of a user.

In the above structure, the frictional device 9, 10 may be configured to increase a friction resistance and the resistance force as the rotation angle of the throttle grip 1 increases.

According to this structure, since, as the rotation angle of the throttle grip 1 increases, the frictional resistance increases to thereby be able to increase the resistance force, in a state where the rotation angle of the throttle grip 1 is large, the rotation load can be increased. On the other hand, in a state where the rotation angle of the throttle grip 1 is small, the rotation load can be decreased. As a result, an operation property of the throttle grip apparatus is enhanced.

In the above structures, the frictional device 9, 10 may include: a rotation side frictional portion 10 integrally rotatable with the throttle grip 1; and a fixed side frictional portion 9 fixed to the handlebar H and disposed in contact with the rotation side frictional portion 10. A friction coefficient of a specific portion of a contact surface of the rotation side frictional portion 10 or the fixed side frictional portion 9 may be different from a friction coefficient of remaining portions of the rotation side frictional portion 10 and the fixed side frictional portion 9, to thereby be able to vary the resistance force of the frictional device according to the rotation angle of the throttle grip 1.

According to this structure, the resistance force of the frictional device 9, 10 can be varied with a simple structure.

Moreover, in this structure, the specific portion of the contact surface may be coated with a material to make the friction coefficient of the specific portion different from the friction coefficient of the remaining portions.

According to this structure, the resistance force of the frictional device can be varied more easily with a more simplified structure.

In the above structures, the throttle grip apparatus may further include an urging member S1 that presses the rotation side frictional portion 10 against the fixed side frictional portion 9; and an adjusting mechanism 4, 5 capable of arbitrarily changing an urging force of the urging member S1.

According to this structure, the resistance force of the friction plate can be adjusted more easily, thereby being able to provide a desired operation feeling.

Other aspects and advantages of the invention will be apparent from the following description, the drawings and the claims.

DETAILED DESCRIPTION OF THE EXEMPLARY EMBODIMENTS

A detailed description of an exemplary embodiment of the present invention will be given below with reference to the accompanying drawings.

Figure 1:
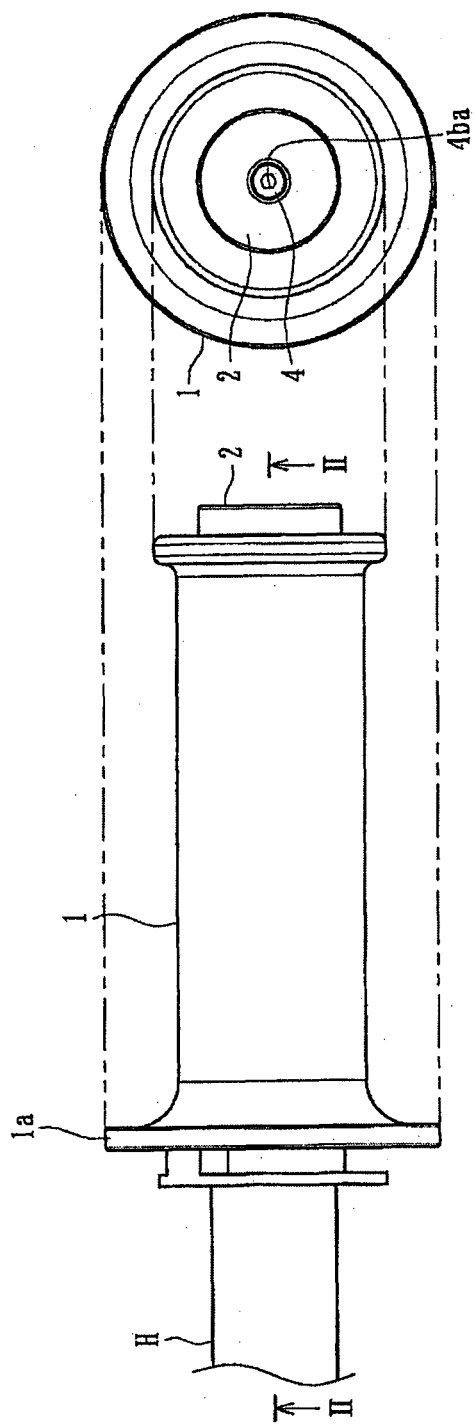
FIG. 1 is an outside view of a throttle grip apparatus according to an exemplary embodiment of the invention.
Figure 2:
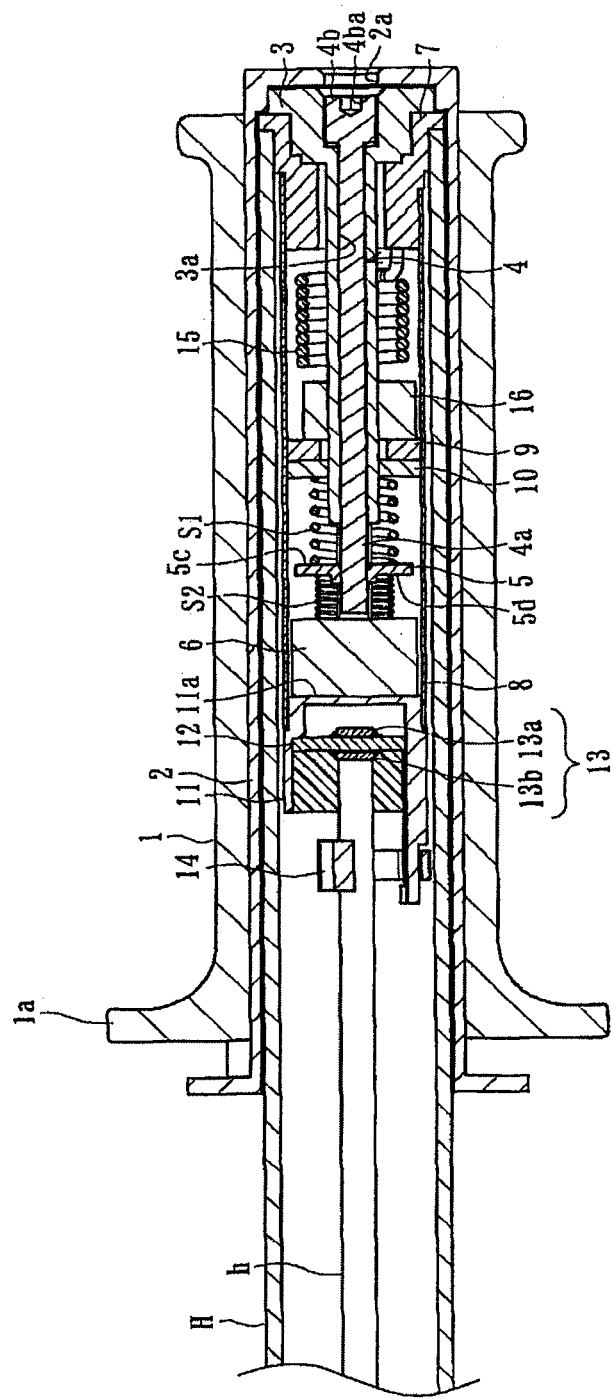
FIG. 2 is a section view taken along the II-II line in FIG. 1.
Figure 3:
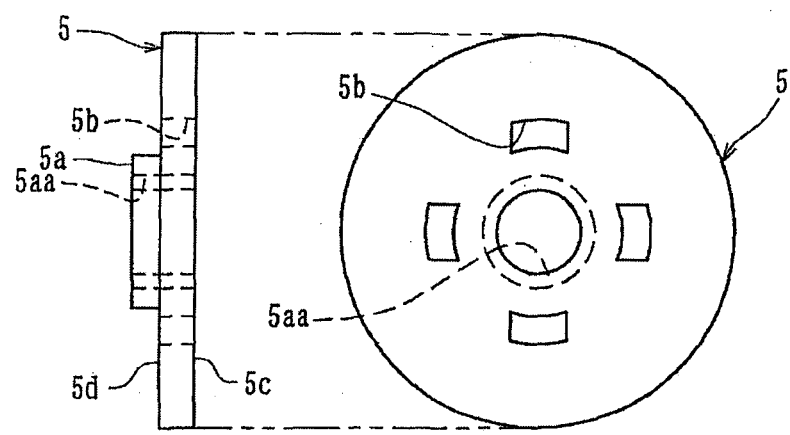
FIG. 3 is a side view and a front view of an adjusting member used in the throttle grip apparatus.

A throttle grip apparatus of the exemplary embodiment is used to detect a rotation angle of a throttle grip mounted on a handlebar of a vehicle (which may be a two-wheeled vehicle) and to transmit an electric signal expressing the detected rotation angle to an electronic control unit (ECU) or the like which is mounted on the vehicle. As shown in FIGS. 1 to 3, the throttle grip apparatus is mainly provided with a throttle grip 1, a magnet 6, an angle sensor 13 (13a, 13b) serving as a detector, a rotation side friction plate (a rotation side friction portion) 10 and a fixed side friction plate (a fixed side friction portion) 9 respectively disposed within a handlebar H, an urging member S1, and an adjusting mechanism (a bolt member 4 and an adjusting member 5).

The throttle grip 1 is mounted on a leading end portion of the handlebar H of the vehicle and can be rotated with respect to the handlebar H coaxially therewith, while an outer peripheral surface of the throttle grip 1 serves as a grip portion which can be gripped by a driver and a flange portion 1a is formed on a base end side of the throttle grip 1. On an inner peripheral surface of the throttle grip 1, there is formed a substantially cylindrical-shaped linking cylinder member 2, while the linking cylinder member 2 can be integrally rotated with the throttle grip 1.

On a right end side (in FIG. 2) of an interior of the linking cylinder member 2, there are disposed a fixed member 7 fixed to the handlebar H and a linking member 3 fixed to the linking cylinder member 2. The linking member 3 includes a penetration hole 3a formed in its central portion in a longitudinal direction thereof and, through the penetration hole 3a, there is inserted a bolt member 4 rotatably. The bolt member 4 includes a male screw portion 4a with a male screw formed on the outer peripheral surface thereof, and a head portion 4b, while the head portion 4b has a tool fit shape 4ba.

Further, in a leading end face of the linking cylinder member 2, specifically, substantially in a central portion thereof, there is formed an opening 2a. The tool fit shape 4ba is allowed to look onto the outside through the opening 2a. That is, the exemplary embodiment provides the tool fit shape 4ba facing the leading end of the throttle grip 1; and thus, a tool can be fitted with the tool fit shape 4ba and can be rotated. Here, according to the exemplary embodiment, the tool fit shape 4ba is formed as a hexagonal shape with which a hexagonal wrench can be fitted.

Into the leading end (in FIG. 2, the left end where multiple leg portions are formed), there is fitted the magnet 6, while the magnet 6 can be integrally rotated with the linking member 3. Owing to this structure, when the throttle grip 1 is rotated, the magnet 6 is also integrally rotated with the linking cylinder member 2 and linking member 3, while a magnetic field generated on the opposing portion (in FIG. 2, on the side of the angle sensor 13) to the magnet 6 can vary according to the rotation angle of the magnet 6. Here, such magnet 6 may be a permanent magnet or a magnet (for example, a plastic magnet) which can generate other magnetic field.

The angle sensor 13 (13a, 13b) (detector) is used to detect variations in the magnetic field of the magnet 6 in a non-contact manner and to detect the rotation angle of the throttle grip 1 according to the value of the detected magnetic field variation, while the angle sensor 13 is made of a chip-like member which is formed on a base plate 12. Here, on the base plate 12, besides the angle sensor 13 capable of increasing or decreasing an output voltage according to a magnetic field generated by the magnet 6, there is formed an amplifier portion for amplifying the output signal of the angle sensor 13. According to the angle sensor 13, a zero point (the signal of the initial position of the throttle grip 1) can be set easily. The base plate 12 and angle sensor 13 are respectively stored within a storage member 11. The storage member 11 includes a storage space formed in the interior portion thereof and is fixed to the fixed member 7 through the fixed cylinder member 8.

From the base plate 12, there is extended a cord h into the handlebar H, while the cord h is used to transmit the amplified detection signal to the outside. Here, in FIG. 2, reference numeral 14 designates a bundling band for fixing the cord h. Also, in a state where the base plate 12 is stored within the storage member 11, there is filled a given type of resin into the storage member 11, whereby the base plate 12 can be resin molded. Thus, when the magnet 6 is rotated with the rotation of the throttle grip 1, the output signal of the angle sensor 13 (13a, 13b) is caused to increase or decrease according to variations in the magnetic field generated by the magnet 6; and, therefore, the rotation angle of the throttle grip 1 can be detected according to the output signal of the angle sensor 13. A signal expressing the detected rotation angle is transmitted through the cord h to an ECU incorporated in a two-wheeled vehicle, and the engine is controlled according to such detection signal (the output of the engine is controlled according to the rotation angle of the throttle grip 1).

On the other hand, on the side of the fixed member 7 (that is, on the side of the handlebar H) within the fixed cylinder member 8, there is fixed the fixed side friction plate 9 and also there is disposed the rotation side friction plate 10 in such a manner that its surface is in contact with the surface of the fixed side friction plate 9. The rotation side friction plate 10 can be integrally rotated with the throttle grip 1 and also the surface of the rotation side friction plate 10 is pressed against the surface of the fixed side friction plate 9 by an urging member S1 made of a coil spring. Thus, when the throttle grip 1 is rotated, since the rotation side friction plate 10 is rotated while it is being pressed against the fixed side friction plate 9, in the rotating operation of the throttle grip 1, there can be generated a resistance force to thereby be able to generate the rotation load of the throttle grip 1.

Also, into a given portion of the linking member 3, there is inserted the adjusting member 5, while the adjusting member 5 is allowed to slide in the longitudinal direction (in FIG. 2, in the right and left direction) of the linking member 3. That is, the adjusting member 5, as shown in FIG. 3, includes multiple holes 5*b* which are formed concentrically. When the leg portions of the linking member 3 are respectively inserted into their associated holes 5*b*, the adjusting member 5 is allowed to slide in the axial direction of the linking member 3 and is prevented from moving in the peripheral direction thereof.

Further, the central portion of the adjusting member 5 is burring worked to form a burring portion 5*a* (a rising portion) and, in the inner periphery of the burring portion 5*a*, there is formed a female screw 5*aa* which can be threadedly engaged with the male screw 4*a* of the bolt member 4. Owing to this, when the bolt member 4 is rotated around its axis, the adjusting member 5 is moved along the male screw portion 4*a* in the right and left direction in FIG. 2. On the other hand, referring to the structure of the urging member S1, one end is contacted with one surface 5*c* of the adjusting member 5 and the other end is contacted with the rotation side friction plate 10, whereby, when the adjusting member 5 moves right and left, the urging force (pressing force) of the urging member S1 to be applied to the adjusting member can be adjusted.

For example, when a tool is fitted with the tool fit shape 4*ba* and is rotated in a given direction, the adjusting member 5 moves to the right side in FIG. 2 (a direction where the adjusting member 5 approaches the rotation side friction plate 10) to thereby be able to compress the whole length of the urging member S1, with the result that the urging force (pressing force) of the urging member S1 to the rotation side friction plate 10 can be increased. Owing to this, the resistance force to be generated in the rotation of the throttle grip 1 can be increased and thus the rotation load of the throttle grip 1 can be increased.

On the other hand, when a tool is fitted with the tool fit shape 4*ba* and is rotated in the opposite direction to the above-mentioned given direction, the adjusting member 5 moves to the left side in FIG. 2 (in the direction where the adjusting member 5 parts away from the rotation side friction plate 10) to thereby extend the whole length of the urging member S1 made of a coil spring and thus reduce the urging force (pressing force) of the urging member S1 to the rotation side friction plate 10. Owing to this, the resistance force generated in the rotation of the throttle grip 1 can be reduced and thus the rotation load of the throttle grip 1 can be reduced.

That is, the frictional device includes the rotation side friction plate 10 integrally rotatable with the throttle grip 1 and the fixed side friction plate 9 fixed to the interior of the handle bar H and disposed in contact with the rotation side friction plate 10. The resistance force adjusting unit includes the urging member S1 for pressing the rotation side friction plate 10 against the fixed side friction plate 9 and the adjusting mechanism (bolt member 4 and adjusting member 5) capable of changing arbitrarily the urging force of the urging member S1 from outside through the opening 2*a*. Owing to this structure, since the pressing force of the rotation side friction plate 10 against the fixed side friction plate 9 can be adjusted by operating the adjusting mechanism, the resistance force to be produced by the frictional device can be adjusted more easily.

Thus, due to provision of the resistance force adjusting unit (urging member S1, bolt member 4 and adjusting member 5) that can adjust arbitrarily the resistance force to be generated by the frictional device (rotation side friction plate 10 and fixed side friction plate 9), the rotation load of the throttle grip 1 can be changed arbitrarily according to the taste of a rider; and, therefore, even when a throttle wire is omitted, the throttle grip 1 can be operated without giving the driver a strange feeling and the resistance force to be generated by the frictional device (rotation side friction plate 10 and fixed side friction plate 9) can be adjusted more easily to thereby obtain a desired operation feeling. Since the adjusting mechanism includes the tool fit shape 4*ba* facing the leading end side of the throttle grip 1 and can change arbitrarily the urging force of the urging member S1 by fitting a tool with the tool fit shape 4*ba* and rotating the tool, the resistance force to be generated by the frictional device (rotation side friction plate 10 and fixed side friction plate 9) can be adjusted more easily.

And, with the other surface 5*d* of the adjusting member 5, there is contacted one end of a spring S2. The other end of the spring S2 is contacted with the magnet 6, whereby the spring S2 can press the magnet 6 against the surface 11*a* of the storage member 11. Owing to this structure, while being pressed against the surface 11*a* of the storage member 11, the magnet 6 is allowed to integrally rotate with the throttle grip 1, which can prevent the space dimension of the magnet 6 with respect to the angle sensor 13 from being shifted due to the vibrations of a vehicle and thus can further enhance the accuracy of the adjustment to be made by the adjusting member 5. Here, as described above, since, when a tool is fitted with the tool fit shape 4*ba* and is then rotated, the adjusting member 5 moves in the right and left in FIG. 2, the whole length of the coil spring S2 can be reduced or extended to thereby adjust the pressing force of the magnet 6 against the surface 11*a*.

Further, within the fixed cylinder member 8, there are disposed a return spring 15, which is used to energize the throttle grip 1 toward its initial position, and also a spring receiver 16 which is fixed to the linking member 3. To the spring receiver 16, there is secured one end of the return spring 15. Also, the other end of the return spring 15 is secured to the fixed member 7. When the gripping force of the hand of a driver having rotated the throttle grip 1 is loosened using such return spring 15, the throttle grip 1 can be rotated toward the initial position. Here, a case may also be fixed to the position of the handlebar H that is situated adjacent to the throttle grip 1, and the return spring 15 may also be stored into the case.

Figure 4:
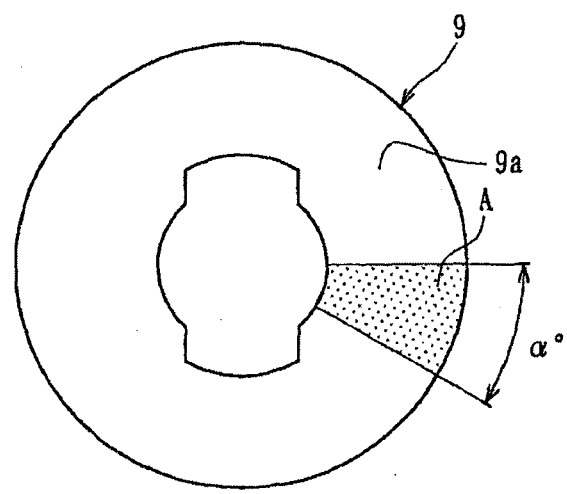
FIG. 4 is a front view of a fixed side friction plate used in the throttle grip apparatus.
Figure 5:
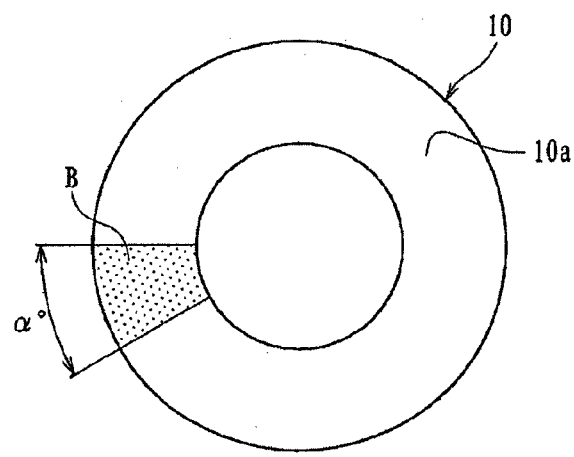
FIG. 5 is a front view of a rotation side friction plate used in the throttle grip apparatus.

Here, according to the exemplary embodiment, the resistance force of the frictional device (rotation side friction plate 10 and fixed side friction plate 9), which is generated according to the rotation angle of the throttle grip 1, can be changed. Specifically, as shown in FIGS. 4 and 5, in the resistance force of the frictional device (rotation side friction plate 10 and fixed side friction plate 9), the given portions (in FIGS. 4 and 5, the areas designated by a reference sign "a°") of the contact surfaces 9*a* and 10*a* thereof are respectively coated with given materials A and B, whereby the friction coefficients of the given portions are made different from the friction coefficients of the other remaining portions of the contact surfaces 9*a* and 10*a*.

Such given materials A and B are made of Teflon (a registered trade mark) or the like which can reduce a friction coefficient. When a given material such as Teflon (a registered trade mark) is coated over the contact surfaces 10*a* and 9*a* of the rotation side friction plate 10 and fixed side friction plate 9 in the range of α° (which may preferably, for example, be 30°), as the rotation angle of the throttle grip 1 increases, the frictional resistance increases to thereby be able to increase the resistance force. Here, a given material for reducing the friction coefficient is not limited to Teflon (a registered trade mark) but there may also be used any one of various materials the friction coefficients of which are smaller than the contact surfaces 10*a* and 9*a* of the rotation side friction plate 10 and fixed side friction plate 9; and, the contact surfaces 10*a* and 9*a* of the rotation side friction plate 10 and fixed side friction plate 9 may also be formed respectively of given materials which are different from each other.

Figure 6:
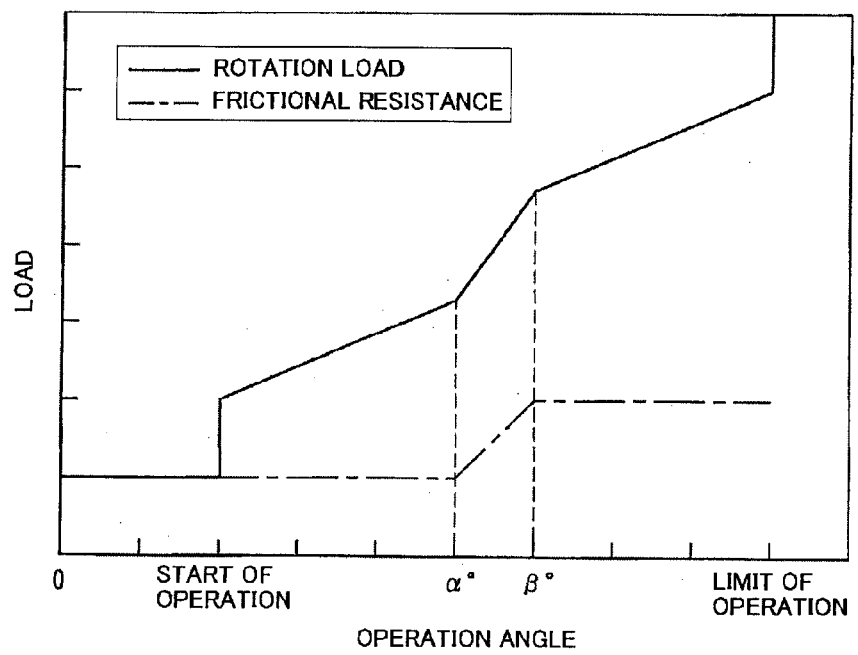
FIG. 6 is a graphical representation of a relationship between rotation angles of a throttle grip used in the throttle grip apparatus and operation loads thereof and resistance forces of a frictional device.

That is, as shown in FIG. 6, when the throttle grip 1 is rotated from the initial position to the α° position, the frictional resistance generated by the frictional device (rotation side friction plate 10 and fixed side friction plate 9) is controlled down to a small constant value and the rotation load in the operation of the throttle grip (operation load) is given mainly by the urging force of the return spring 15. And, when the throttle grip 1 is rotated over the position α° up to a position designated by reference sign "β°", the frictional resistance generated by the frictional device (rotation side friction plate 10 and fixed side friction plate 9) increases gradually and thus, as shown in FIG. 6, the rotation load increases suddenly. And, when the throttle grip 1 is rotated over the position "β°", the frictional resistance generated by the frictional device (rotation side friction plate 10 and fixed side friction plate 9) is larger than the frictional resistance generated in the rotation of the throttle grip 1 up to the position "α°" but becomes constant again, while the increasing rate of the rotation load also becomes constant.

In this manner, according to the exemplary embodiment, as the rotation angle of the throttle grip 1 increases, the friction resistance increases to thereby be able to increase the resistance force. According to the exemplary embodiment, since the frictional device (rotation side friction plate 10 and fixed side friction plate 9) is structured such that the resistance force to be generated by the frictional device according to the rotation angle of the throttle grip 1 can be varied, the rotation load to be generated by the rotational operation of the throttle grip 1 can be changed according to the taste of a user. Especially, since, as the rotation angle of the throttle grip 1 increases, the friction resistance increases to thereby be able to increase the resistance force, in a state where the rotation angle of the throttle grip 1 is large, the rotation load can be increased to thereby be able to control the rotation operation and, in a state where the rotation angle of the throttle grip 1 is small, the rotation load can be decreased to thereby be able to facilitate the rotation operation, so that the operation property of the throttle grip 1 can be enhanced further.

Also, the exemplary embodiment is structured such that, as the rotation angle of the throttle grip 1 increases, the friction resistance increases to thereby be able to increase the resistance force. However, on the contrary, the exemplary embodiment may also be structured such that, as the rotation angle of the throttle grip 1 increases, the friction resistance decreases to thereby be able to decrease the resistance force. Even in this case, since the resistance force to be generated by the frictional device according to the rotation angle of the throttle grip 1 can be varied, the rotation load to be generated in the rotation operation of the throttle grip 1 can be changed variously according to the need of a user.

Also, since the frictional device includes the rotation side friction plate 10 integrally rotatable with the throttle grip 1 and the fixed side friction plate 9 fixed to the interior of the handle bar H and disposed in contact with the rotation side friction plate 10, and also since the friction coefficient of a given portion of the contact surface (10a or 9a) of the rotation side friction plate 10 or fixed side friction plate 9 is set different from the friction coefficient of the other remaining portions of the contact surface (10a or 9a) of the frictional device to thereby be able to change the resistance force which is generated according to the rotation angle of the throttle grip 1, the resistance force to be generated according to the rotation angle of the throttle grip 1 can be changed with a simple structure.

Further, since the given portion of the contact surface of the rotation side friction plate 10 or fixed side friction plate 9 is coated with a given material such as Teflon (registered trade mark) to thereby make the friction coefficient of the given portion different from the friction coefficient of the other remaining portions of the contact surface of the frictional device, the resistance force to be generated according to the rotation angle of the throttle grip 1 can be changed more easily with a further simplified structure. Here, alternatively, a surface working treatment such as a mirror finishing treatment or a blasting treatment may be carried out on the given portion of the contact surface of the rotation side friction plate 10 or fixed side friction plate 9, thereby making the friction coefficient of the given portion different from the other remaining portions of the contact surface of the frictional device.

Although description has been given heretofore of the exemplary embodiment, the invention is not limited to this but the invention can also apply to any other structure where, as the throttle grip 1 is rotated from the initial position, the resistance force to be generated according to the rotation angle of the throttle grip 1 varies in three or more stages or varies continuously, provided that the structure can vary the resistance force. Also, the invention is not limited to the structure in which the frictional device (rotation side friction plate 10 and fixed side friction plate 9) is disposed within the handlebar H but, both of the rotation side friction plate 10 and fixed side friction plate 9, or any one of them may be disposed outside the handlebar H (for example, within a case fixed to the handlebar H at a position adjacent to the throttle grip 1).

Further, the resistance force adjusting unit is not limited to the structure employed in the above-mentioned embodiment but there may also be employed other various types of adjusting units, provided that they can adjust arbitrarily the resistance force to be generated by the frictional device. Further, instead of the angle sensor 13, there may also be used a different type of detecting device, provided that it can detect variations in the magnetic field of the magnet 6 and can detect the rotation angle of the throttle grip 1 according to the detected variation value. Here, according to the exemplary embodiment, the throttle grip apparatus is mounted on the handlebar of a two-wheeled vehicle. However, the present apparatus may also be mounted on other types of vehicles (for example, an ATV and a snowmobile) which include handlebars.

The invention can apply to any one of throttle grip apparatus having different outer shapes or having other functions added thereto, provided that it includes a frictional device structured such that the resistance force thereof, which is generated according to the rotation angle of the throttle grip, can be varied.

DESCRIPTION OF REFERENCE NUMERALS AND SIGNS

1: Throttle grip
2: Linking cylinder member
3: Linking member
4: Bolt member (adjusting mechanism)
4ba: Tool fit shape
5: Adjusting member (adjusting mechanism)
6: Magnet
7: Fixed member
8: Fixed cylinder member
9: Fixed side friction plate
10: Rotation side friction plate
11: Storage member
12: Base plate
13: Angle sensor (detector)
14: Bundling band 15: Return spring
16: Spring receiver
h: Cord
H: Handlebar
S1: Urging member
S2: Coil spring

What is claimed is:

1. A throttle grip apparatus comprising:
   a throttle grip rotatably mounted on a leading end of a vehicle handlebar;
   a magnet which is integrally rotatable with the throttle grip;
   a detector that detects variations of a magnetic field of the magnet in a non-contact manner and also detects a rotation angle of the throttle grip according to a value of the detected variation of the magnetic field; and
   a frictional device configured to generate a frictional resistance force during a rotation of the throttle grip and generate a rotation load of the throttle grip,
   wherein the frictional device is configured to vary the resistance force based on the rotation angle of the throttle grip, and wherein the frictional device includes:
      a rotation side frictional portion integrally rotatable with the throttle grip; and
      a fixed side frictional portion fixed to the handlebar and disposed in contact with the rotation side frictional portion, and
   wherein a friction coefficient of a specific portion of a contact surface of the rotation side frictional portion or the fixed side frictional portion is made different from a friction coefficient of the contact surface which does not include said specific portion, to thereby be able to vary the frictional resistance force of the frictional device according to the rotation angle of the throttle grip,
   wherein the rotation side frictional portion is pressed against the fixed side frictional portion as the throttle grip is rotated such that a frictional resistance force is generated to generate the rotation load of the throttle grip,
   wherein the rotation load of the throttle grip during the rotation of the throttle grip can be varied based on a demand of a user,
   wherein a mechanical feedback is created by a mechanical contact between the specific portion of the contract surface of at least one of the rotation side frictional portion and the fixed side frictional portion being pressed against another of the at least one of the rotation side frictional portion and the fixed side frictional portion, and
   wherein the mechanical feedback is sensed by the user.

2. The throttle grip apparatus according to claim 1, wherein the frictional device is configured to increase a friction resistance and the frictional resistance force as the rotation angle of the throttle grip increases.

3. The throttle grip apparatus according to claim 1, wherein said specific portion of the contact surface is coated with a material to make the friction coefficient of said specific portion different from the friction coefficient of the contact surface.

4. The throttle grip apparatus according to claim 1, further comprising:
   an urging member that presses the rotation side frictional portion against the fixed side frictional portion; and
   an adjusting mechanism capable of arbitrarily changing an urging force of the urging member.

* * * * *